(12) United States Patent
Fujino et al.

(10) Patent No.: US 8,008,801 B2
(45) Date of Patent: Aug. 30, 2011

(54) VEHICLE POWER SUPPLY DEVICE

(75) Inventors: Takeshi Fujino, Wako (JP); Minoru Noguchi, Wako (JP); Eisuke Komazawa, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 12/314,199

(22) Filed: Dec. 5, 2008

(65) Prior Publication Data

US 2009/0146493 A1 Jun. 11, 2009

(30) Foreign Application Priority Data

Dec. 7, 2007 (JP) ................................. 2007-317043

(51) Int. Cl.
*B60L 1/00* (2006.01)
(52) U.S. Cl. ...................................................... 307/10.1
(58) Field of Classification Search .................. 307/10.1
See application file for complete search history.

(56) References Cited

U.S. PATENT DOCUMENTS 7,436,148 B2 * 10/2008 Saeki et al. ................... 320/104
7,804,196 B2 * 9/2010 Watanabe et al. ............... 307/82

FOREIGN PATENT DOCUMENTS

| JP | 2000-012059 | | 1/2000 |
| JP | 2004-248432 | A | 9/2004 |
| JP | 2006-073506 | | 3/2006 |
| JP | 2007-209161 | A | 8/2007 |

* cited by examiner

*Primary Examiner* — Michael Rutland Wallis
(74) *Attorney, Agent, or Firm* — Squire, Sanders & Dempsey (US) LLP

(57) ABSTRACT

A vehicle power supply device which prevents a lack of power supply to the motor and insufficient recovery of regenerative electric power of the motor at the time of switching between power running and regeneration. First input-output sections (3*a*, 3*b*) of a first DC-DC converter (3) are connected to second input-output sections (4*d*, 4*e*) of a PDU (4), second input-output sections (3*c*, 3*d*) of the first DC-DC converter (3) are connected to a fuel cell (1) and a capacitor (2), first input-output sections (20*a*, 20*b*) of a second DC-DC converter (20) are connected to second input-output sections (4*d*, 4*e*) of the PDU (4), and second input-output sections (20*c*, 20*d*) of the second DC-DC converter (20) are connected to a lithium-ion battery (21). A voltage control means (31) places the first DC-DC converter (3) or the second DC-DC converter (20) in a direct connection state and controls an output voltage of the other DC-DC converter according to an output voltage of the DC-DC converter placed in the direct connection state during the power running of the motor (5) and during regeneration thereof.

5 Claims, 12 Drawing Sheets

VEHICLE POWER SUPPLY DEVICE

BACKGROUND OF THE INVENTION

1. Field of the Invention

The present invention relates to a vehicle power supply device which is mounted on a vehicle with an output section connected to a motor that rotates with a driving wheel, which supplies the motor with driving electric power during power running of the motor, and which recovers regenerative electric power of the motor during regeneration of the motor.

2. Description of the Related Art

Conventionally, for example, as a power source of a fuel cell vehicle, there is known a vehicle power supply device in which a fuel cell 100 is connected to a drive motor 103 via a contactor 101 and an inverter 102 and in which a battery 105 is connected in parallel with the fuel cell 100 via a DC-DC converter 104 as shown in FIG. 11(a) (for example, refer to Japanese Patent Application Laid-Open No. 2006-73506 [pp. 4 to 5, FIG. 1]).

This type of vehicle power supply device turns on the contactor 101 (closed state) to supply power to the inverter 102 from the fuel cell 100 and increases or decreases an output voltage of the battery 105 by using the DC-DC converter 104 to supply the output voltage to the inverter 102, during power running of the motor 103. Thereby, the vehicle power supply device assists the fuel cell 100 by using output power from the battery 105 in the case of insufficient output power of the fuel cell 100.

On the other hand, during regeneration of the motor 103, the vehicle power supply device turns off the contactor 101 to disconnect the electrical connection between the fuel cell 100 and the inverter 102 and directly connects the fuel cell 100 to the DC-DC converter 104 in this state to recover the regenerative electric power of the motor 103 to the battery 105 via the inverter 102 and the DC-DC converter 104.

The configuration of the vehicle power supply device, which is shown in FIG. 11(a), is advantageous in a case where the range of use of the output voltage of the fuel cell 100 is higher than the output voltage of the battery 105 and the output voltage of the battery 105 is decreased by the DC-DC converter 104 before use. In this case, however, it is necessary to increase the number of stacks of the fuel cell 100 to increase the output voltage, which leads to a disadvantage of cost increase in the fuel cell 100.

Moreover, as shown in FIG. 11(b), there is known a vehicle power supply device having a DC-DC converter 106, instead of the contactor 101, with the battery 105 directly connected to the DC-DC converter 106 and the inverter 102 without passing through a DC-DC converter (refer to, for example, Japanese Patent Application Laid-Open No. 2000-12059 [pp. 5 to 6, FIG. 1]).

In the configuration of the vehicle power supply device, which is shown in FIG. 11(b), does not have a voltage control means for the battery 105, and therefore when the battery 105 outputs the voltage, the DC-DC converter 106 always needs to control the output voltage of the fuel cell 100 to match the output voltage of the battery 105. For this reason, the vehicle power supply device has a disadvantage that power loss increases along with voltage conversion in the DC-DC converter 106.

Moreover, according to the configuration shown in FIG. 11(b), the use of the DC-DC converter 106 enables a decrease in the output voltage of the fuel cell 100 and therefore it is possible to downsize the fuel cell 100 by decreasing the number of stacks thereof. Decreasing the number of stacks of the fuel cell 100 as described above, however, causes a disadvantage of low responsibility when rapidly increasing output current of the fuel cell 100.

In order to avoid the above conventional disadvantage, there may be a configuration in which the fuel cell 100 is connected to an inverter 102 via a DC-DC converter 110 and a capacitor 111 is connected between output terminals of the fuel cell 100 as shown in FIG. 12.

According to the configuration of FIG. 12, during power running of the motor 103, the power output from the capacitor 111 compensates for transient low responsibility of the fuel cell 100 and the power output from the battery 105 assists the fuel cell 100 and the capacitor 111 in supplying the insufficient output power thereof, thereby enabling the downsizing of the fuel cell 100.

On the other hand, during regeneration of the motor 103, it is possible to charge the capacitor 111 by increasing or decreasing the output voltage of the inverter 102 by using the DC-DC converter 110. Moreover, it is possible to charge the battery 105 by increasing or decreasing the output of a inverter 102 by using the DC-DC converter 104.

In the configuration of FIG. 12, however, when, during regeneration of the motor 103, the DC-DC converters 104 and 110 perform a step-up or step-down operation to reverse the current direction of the DC-DC converters 104 and 110 to enable the current to be applied from the inverter 102 to the motor 103 from a state where the current is applied from the inverter 102 to the capacitor 111 and the battery 105 so that the motor 103 is switched to power running, hunting may occur in output voltage from the DC-DC converters 104 and 110 to the inverter 102 due to a difference in control response to the switching in the current direction of the DC-DC converters 104 and 110.

Moreover, this condition causes a delay in power supply from the inverter 102 to the motor 103 for the required power of the motor 103, for example, according to an acceleration command, which lowers the acceleration performance of a vehicle and thereby deteriorates the drivability and regenerating efficiency.

Moreover, when, during power running of the motor 103, the DC-DC converters 104 and 110 perform a step-up or step-down operation to reverse the current direction of the DC-DC converters 104 and 110 to enable the current to be applied from the inverter 102 to the capacitor 111 and the battery 105 from a state where the current is applied from the inverter 102 to the motor 103 so that the motor 103 is switched to regeneration, a delay in switching of the current direction in the DC-DC converters 104 and 110 causes insufficient recovery of regenerative electric power.

SUMMARY OF THE INVENTION

Therefore, it is an object of the present invention to provide a vehicle power supply device capable of preventing a lack of power supply to the motor at the time of switching from regeneration to power running and preventing insufficient recovery of regenerative electric power of the motor at the time of switching from power running to regeneration, when switching is performed between power running and regeneration of the motor with a fuel cell, a capacitor, and a secondary battery connected to an inverter via DC-DC converters.

According to an aspect of the present invention, there is provided a vehicle power supply device which is mounted on a vehicle and connected to a motor rotating with a driving wheel via an external input-output section so as to supply the motor with driving electric power during power running of the motor and to recover regenerative electric power of the motor during regeneration of the motor.

Moreover, the vehicle power supply device comprises: an inverter which has first and second input-output sections with the first input-output section connected to the external input-output section and which generates a driving voltage of the motor from a DC voltage, which is input to the second input-output section, and outputs the driving voltage from the first input-output section during the power running of the motor, while converting a regenerative voltage of the motor, which is input to the first input-output section, to a DC voltage and outputting the DC voltage from the second input-output section during regeneration of the motor; a fuel cell; a capacitor connected in parallel with the fuel cell; a first bidirectional DC-DC converter which has first and second input-output sections and wherein the first input-output section is connected to the second input-output section of the inverter and the second input-output section is connected to the fuel cell and the capacitor; a secondary battery; a second bidirectional DC-DC converter which has first and second input-output sections and wherein the first input-output section is connected to the second input-output section of the inverter and the second input-output section is connected to the secondary battery; and a voltage control means which places one of the first DC-DC converter and the second DC-DC converter in a direct connection state and controls an output voltage of the other DC-DC converter according to an output voltage of the DC-DC converter placed in the direct connection state during at least one of the power running and the regeneration of the motor.

According to this invention, the fuel cell and the capacitor are connected to the inverter via the first DC-DC converter, and the secondary battery is connected to the inverter via the second DC-DC converter. Moreover, the voltage control means places one of the first DC-DC converter and the second DC-DC converter in the direct connection state during at least one of the power running and the regeneration of the motor. The representation "placing the DC-DC converter in the direct connection state" means halting the switching operation in the DC-DC converter and making the DC-DC converter conductive between the first input-output terminal and the second input-output terminal bidirectionally.

One of the first DC-DC converter and the second DC-DC converter is placed in the direct connection state as described above, thereby avoiding the necessity of switching the current direction of the DC-DC converter placed in the direct connection state of the first DC-DC converter and the second DC-DC converter when the motor is switched from regeneration to power running. Since there is no waiting time required for switching the current direction in this instance, it is possible to start the power supply to the inverter immediately. With respect to the DC-DC converter not in the direct connection state, the voltage control means controls an output voltage of the DC-DC converter according to an output voltage of the DC-DC converter in the direct connection state, thereby enabling the supply voltage from the inverter to the motor to be increased while preventing hunting of a voltage input to the inverter. Therefore, it is possible to prevent a lack of power supply from the inverter to the motor at the time of switching the motor from regeneration to power running.

Moreover, there is no need to switch the current direction of the DC-DC converter in the direct connection state among the first DC-DC converter and the second DC-DC converter at the time of switching the motor from power running to regeneration, thereby enabling a prompt start of recovery of electric power from the inverter. With respect to the DC-DC converter not in the direct connection state, the voltage control means controls the output voltage of the DC-DC converter according to the output voltage of the DC-DC converter in the direct connection state, thereby enabling the voltage of the electric power collected via the DC-DC converter not in the direct connection state to be adjusted in accordance with the state of a destination for recovery (the capacitor or the battery connected to the DC-DC converter not in the direct connection state). This prevents recovered electric power collected from the inverter to the capacitor and to the secondary battery from being insufficient at the time of switching the motor from power running to regeneration.

Moreover, the vehicle power supply device is characterized in that an output voltage of the secondary battery is set to a voltage higher than an output voltage range of the fuel cell and that the voltage control means places the first DC-DC converter in the direct connection state and causes the second DC-DC converter to perform a step-down operation so as to decrease a difference between the output voltage of the first DC-DC converter and the output voltage of the second DC-DC converter during the power running of the motor.

In this invention, generally a power loss of the DC-DC converter caused by a step-down operation is less than a power loss thereof caused by a step-up operation. Therefore, the voltage control means places the first DC-DC converter in the direct connection state and causes the second DC-DC converter to perform the step-down operation during the power running of the motor, thereby preventing the power loss caused by the second DC-DC converter when supplying power from the secondary battery to the inverter.

Moreover, the vehicle power supply device further comprises a capacitor voltage detection means which detects a voltage between terminals of the capacitor, and the voltage control means controls the inverter so that an output voltage from the second input-output section of the inverter becomes higher than the voltage between the terminals of the capacitor by a predetermined level to place the first DC-DC converter in the direct connection state during the regeneration of the motor.

According to this invention, the voltage control means controls the inverter so that an output voltage from the second input-output section of the inverter becomes higher than the voltage between the terminals of the capacitor by a predetermined level during the regeneration of the motor. The first DC-DC converter is then placed in the direct connection state under the above condition, which thereby enables the capacitor to be charged with the regenerative electric power of the motor without causing a switching loss in the first DC-DC converter. Moreover, it is possible to immediately supply electric power from the fuel cell and the capacitor to the inverter via the first DC-DC converter when the motor is switched from regeneration to power running, thereby enabling an increase in the responsibility of switching from regeneration to power running.

Moreover, the vehicle power supply device further comprises a secondary battery voltage detection means which detects a voltage between terminals of the secondary battery, and the voltage control means controls the second DC-DC converter so that an output voltage from the second input-output section of the second DC-DC converter becomes higher than the voltage between the terminals of the secondary battery by a predetermined level when controlling the inverter so that the output voltage from the second input-output section of the inverter becomes higher than the voltage between the terminals of the capacitor by the predetermined level to place the first DC-DC converter in the direct connection state during the regeneration of the motor.

According to this invention, the voltage control means controls the second DC-DC converter so that the output voltage from the second input-output section of the second DC- DC converter becomes higher than the voltage between the terminals of the secondary battery by the predetermined level while the capacitor is charged with the first DC-DC converter in the direct connection state, thereby enabling the secondary battery to be charged via the second DC-DC converter.

Moreover, the vehicle power supply device further comprises a secondary battery voltage detection means which detects a voltage between terminals of the secondary battery, and the voltage control means controls the inverter so that an output voltage from the second input-output section of the inverter becomes higher than the voltage between the terminals of the secondary battery by a predetermined level to place the second DC-DC converter in the direct connection state during the regeneration of the motor.

According to this invention, the voltage control means controls the inverter so that the output voltage from the second input-output section of the inverter becomes higher than the voltage between the terminals of the secondary battery by the predetermined level during the regeneration of the motor. Then, the voltage control means places the second DC-DC converter in the direct connection state in this state. The second DC-DC converter placed in the direct connection state in this manner enables the secondary battery to be charged with the regenerative electric power of the motor without a switching loss in the second DC-DC converter. Further, it is possible to immediately supply electric power from the secondary battery to the inverter via the second DC-DC converter at the time of switching the motor from regeneration to power running, thereby enabling an increase in the responsibility of the switching from regeneration to power running.

Moreover, the vehicle power supply device further comprises a capacitor voltage detection means which detects a voltage between terminals of the capacitor, and the voltage control means controls the first DC-DC converter so that an output voltage from the second input-output section of the first DC-DC converter becomes higher than the voltage between the terminals of the capacitor by a predetermined level when controlling the inverter so that the output voltage from the second input-output section of the inverter becomes higher than the voltage between the terminals of the capacitor by the predetermined level to place the second DC-DC converter in the direct connection state during the regeneration of the motor.

According to this invention, the voltage control means controls the first DC-DC converter so that the output voltage from the second input-output section of the first DC-DC converter becomes higher than the voltage between the terminals of the capacitor by the predetermined level when the secondary battery is charged with the second DC-DC converter in the direct connection state, thereby enabling the capacitor to be charged via the first DC-DC converter.

DETAILED DESCRIPTION OF THE PREFERRED EMBODIMENTS

Figure 1:
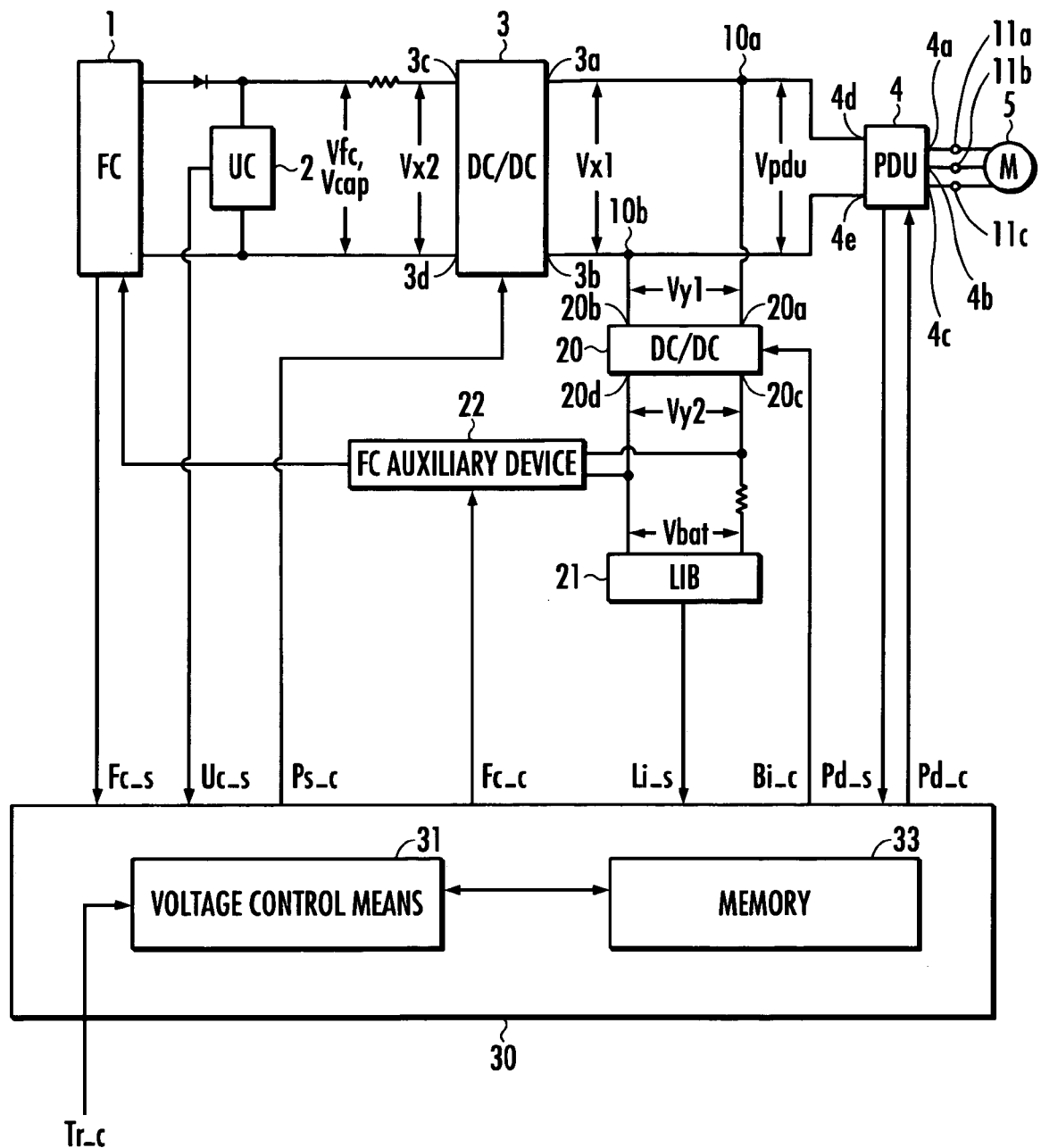
FIG. 1 is a general configuration diagram of a vehicle power supply device according to this embodiment.
Figure 2:
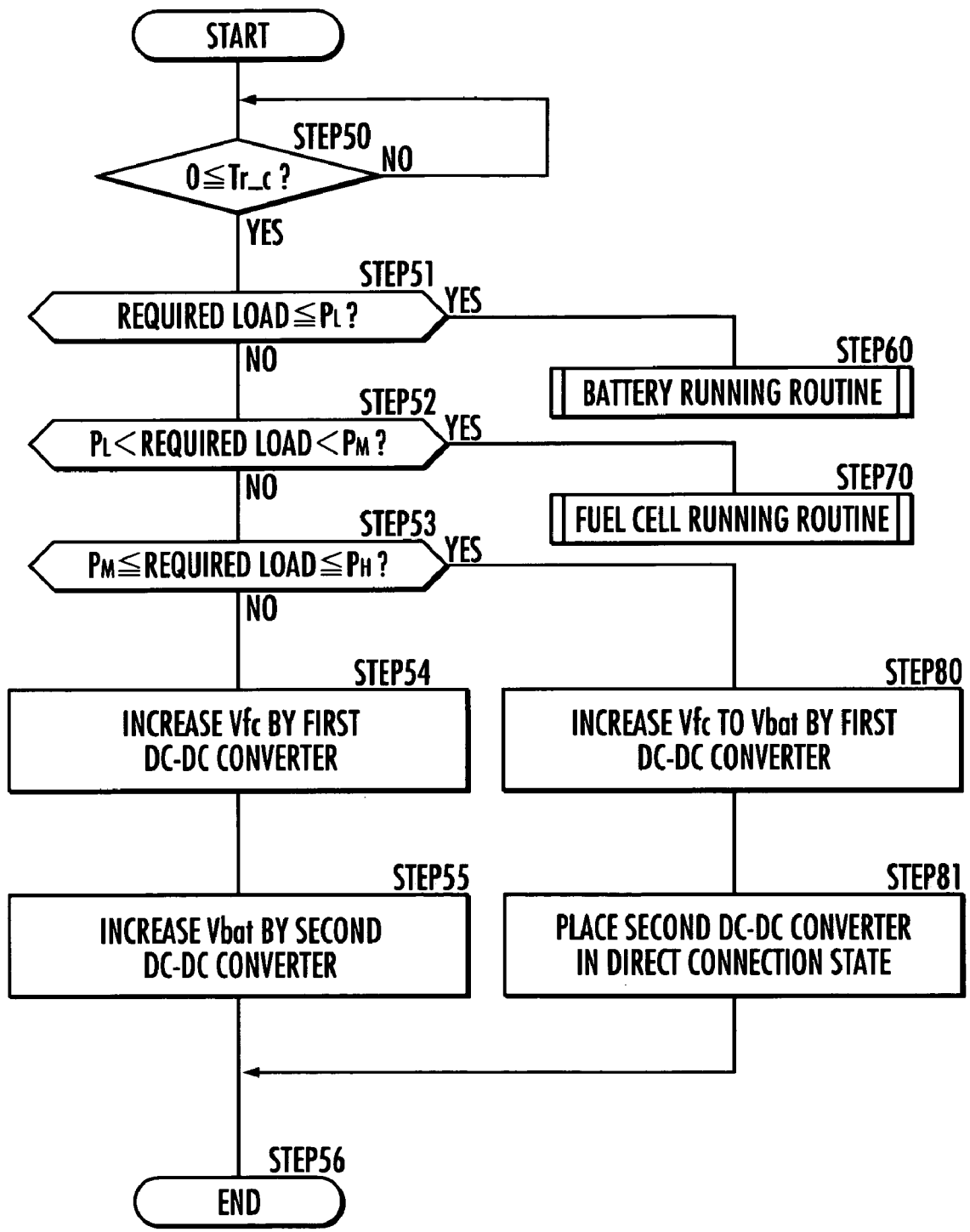
FIG. 2 is a flowchart illustrating an execution procedure for an output control in the vehicle power supply device shown in FIG. 1.
Figure 3:
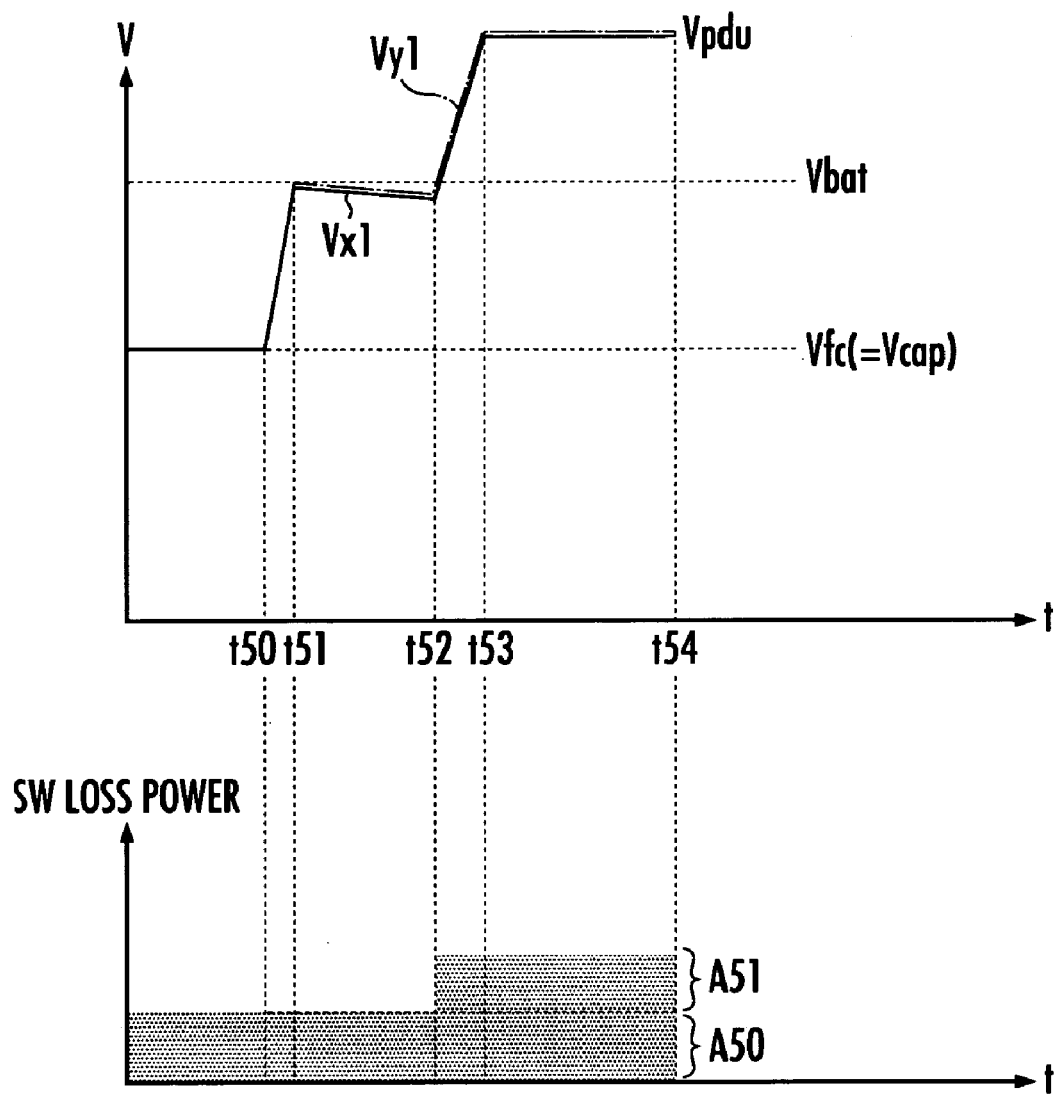
FIG. 3 is an explanatory diagram illustrating an operating mode of a DC-DC converter during execution of the output control.
Figure 4:
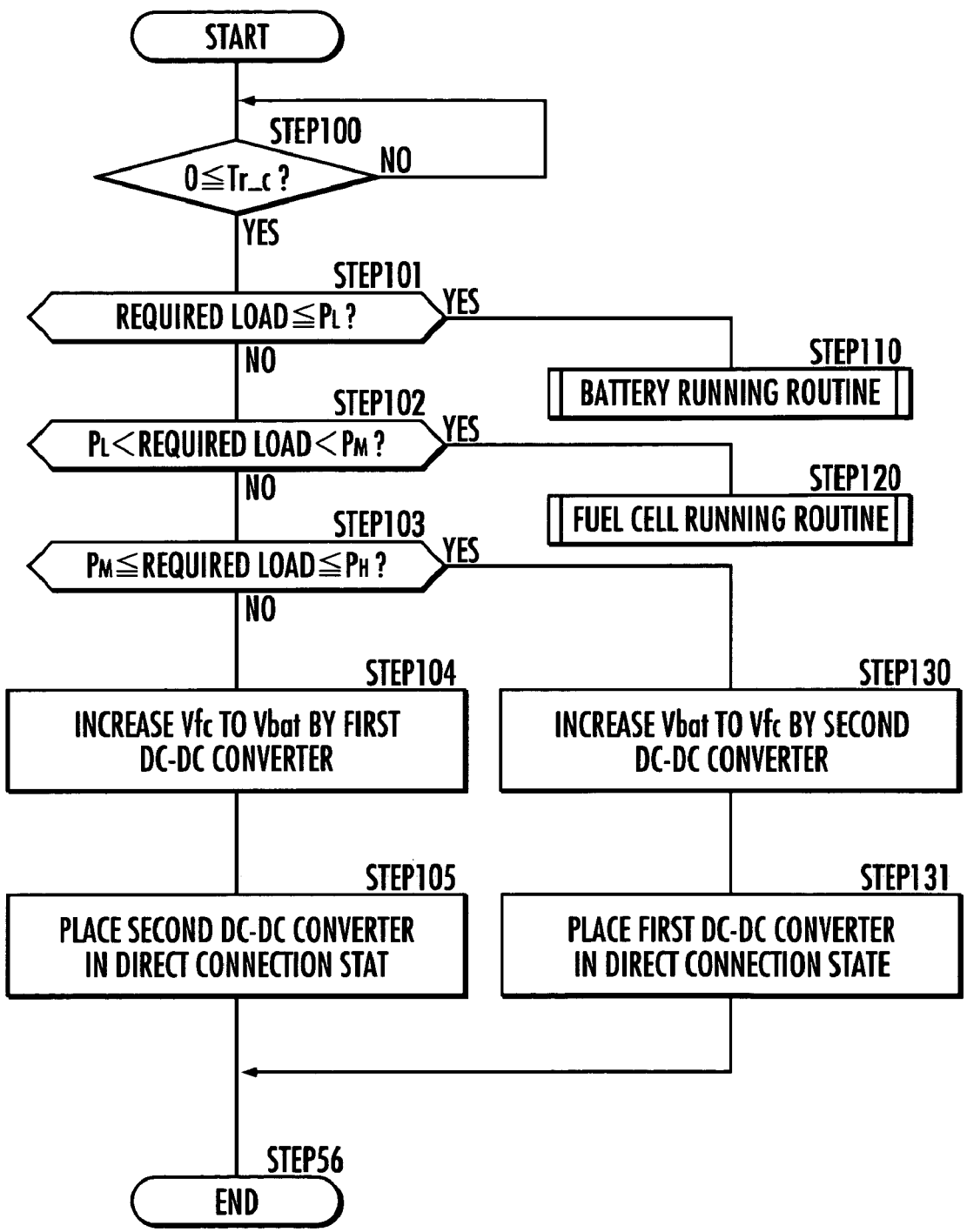
FIG. 4 is a flowchart illustrating an execution procedure for an output control in the vehicle power supply device shown in FIG. 1.
Figure 5:
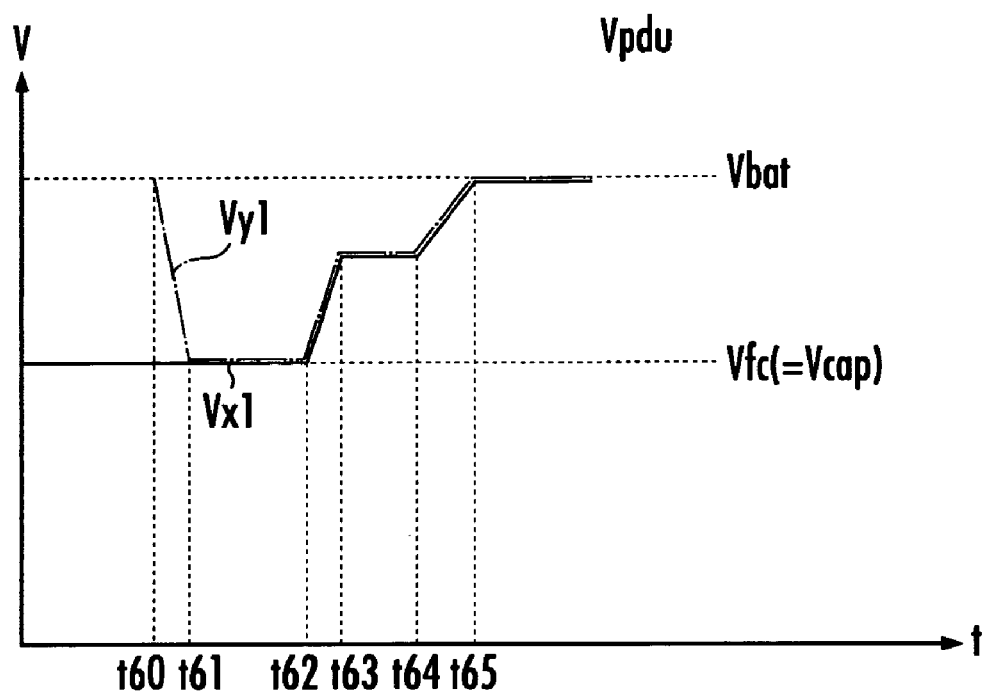
FIG. 5 is an explanatory diagram illustrating an operating mode of the DC-DC converter during execution of the output control.
Figure 5:
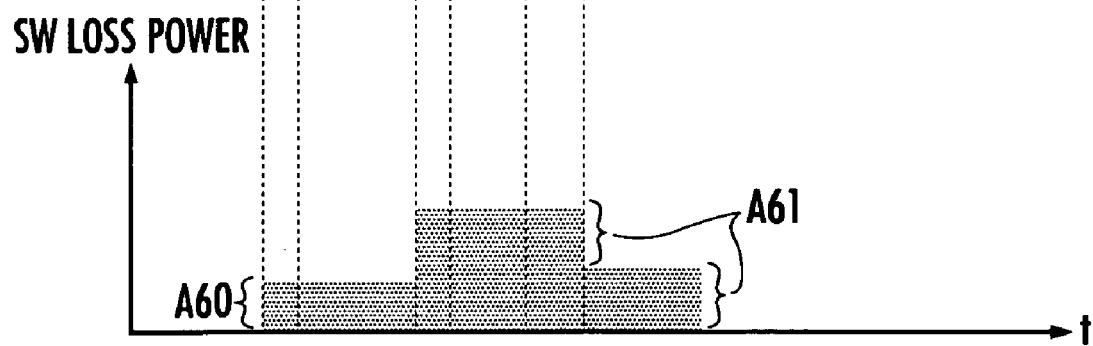
Figure 6:
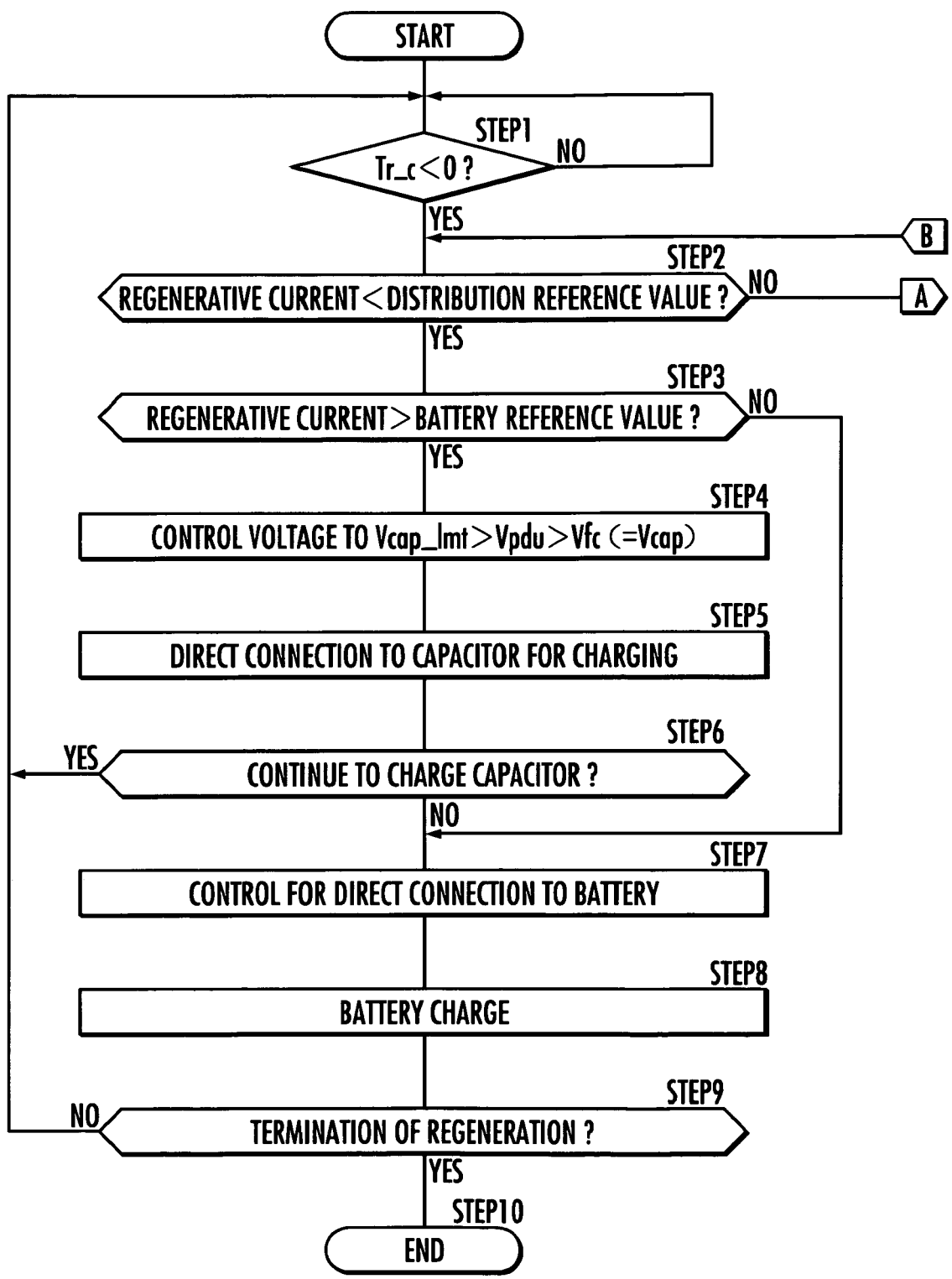
FIG. 6 is a flowchart illustrating an execution procedure for a regenerative control in the vehicle power supply device shown in FIG. 1.
Figure 7:
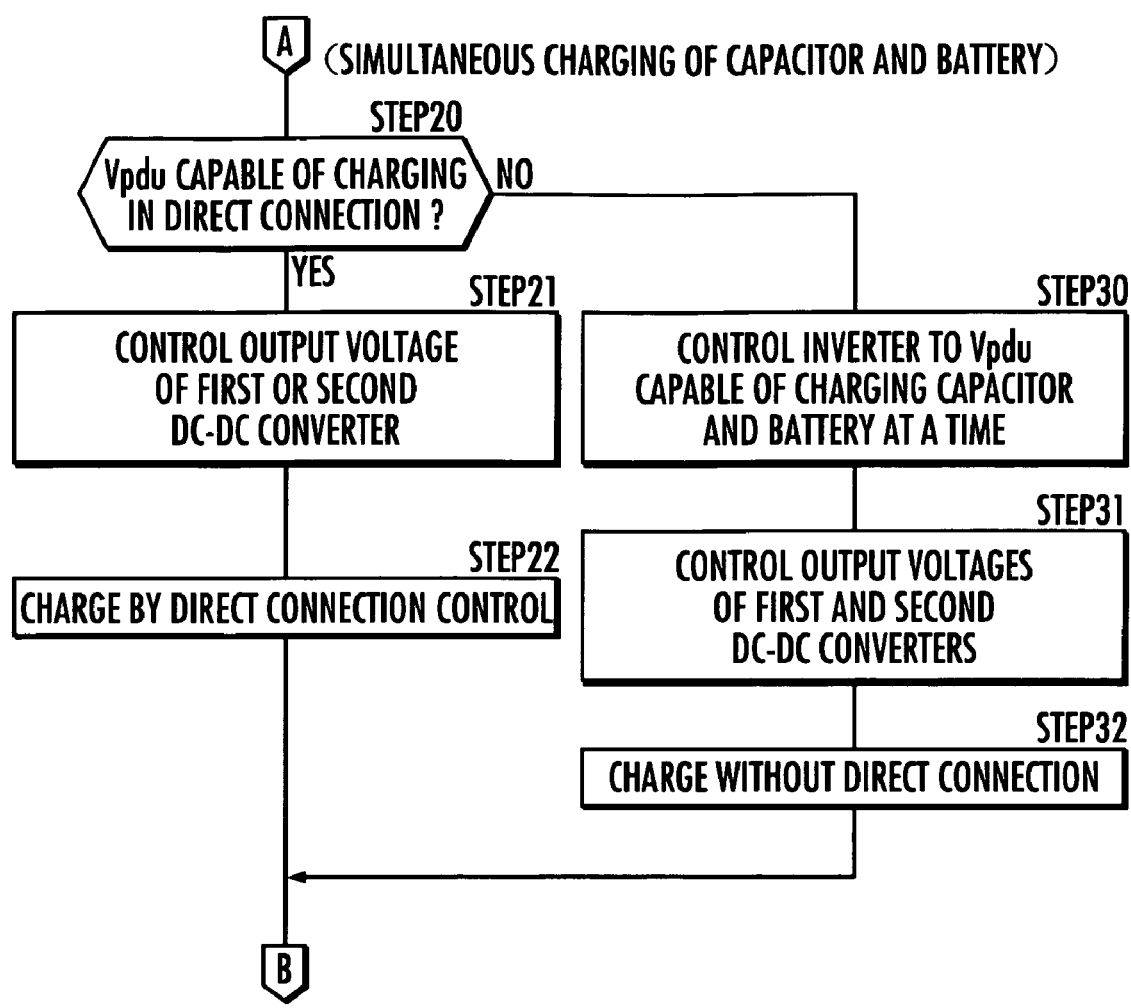
FIG. 7 is a flowchart illustrating an execution procedure for a regenerative control in the vehicle power supply device shown in FIG. 1.
Figure 8:
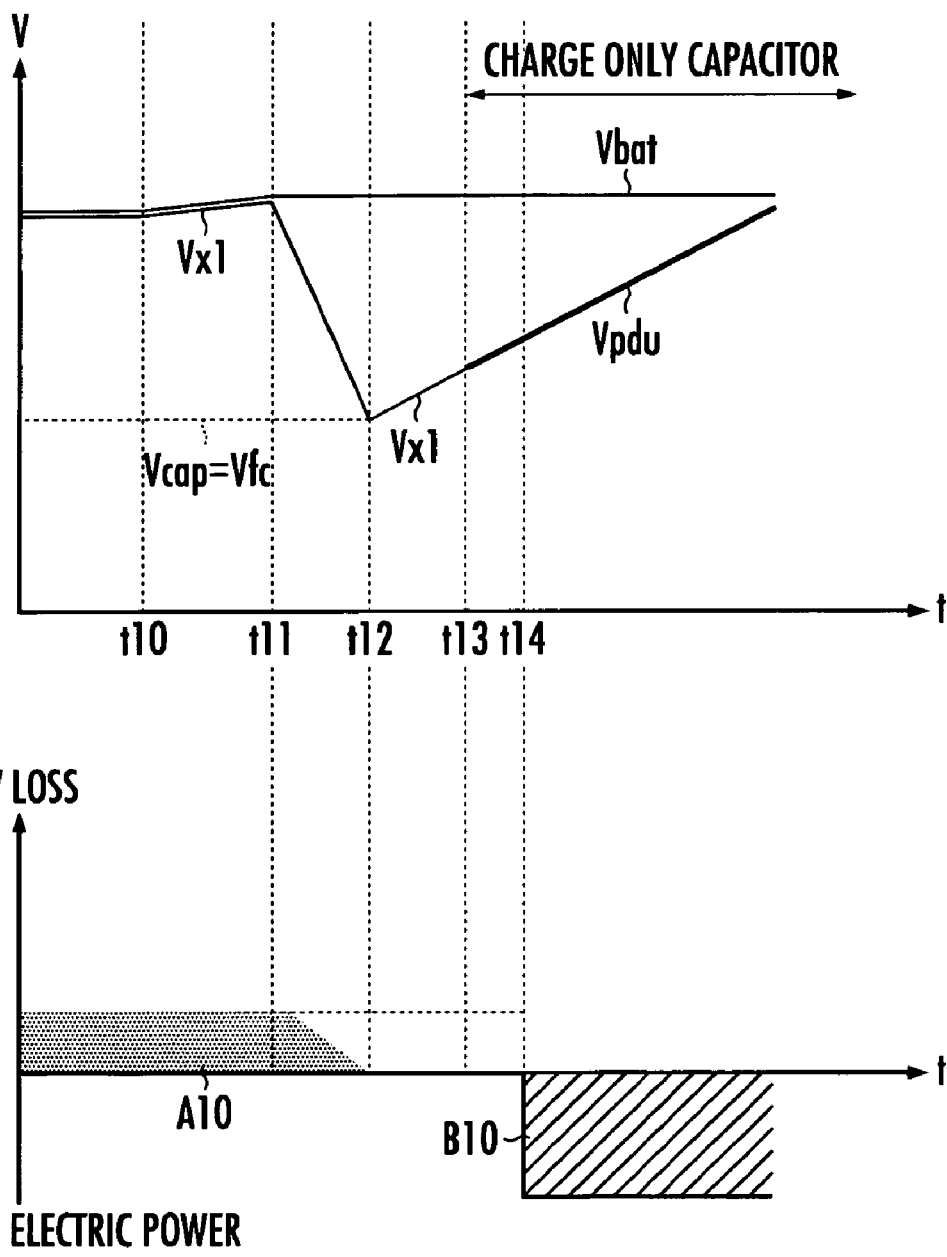
FIG. 8 is an explanatory diagram illustrating an operating mode of the DC-DC converter during execution of the regenerative control.
Figure 9:
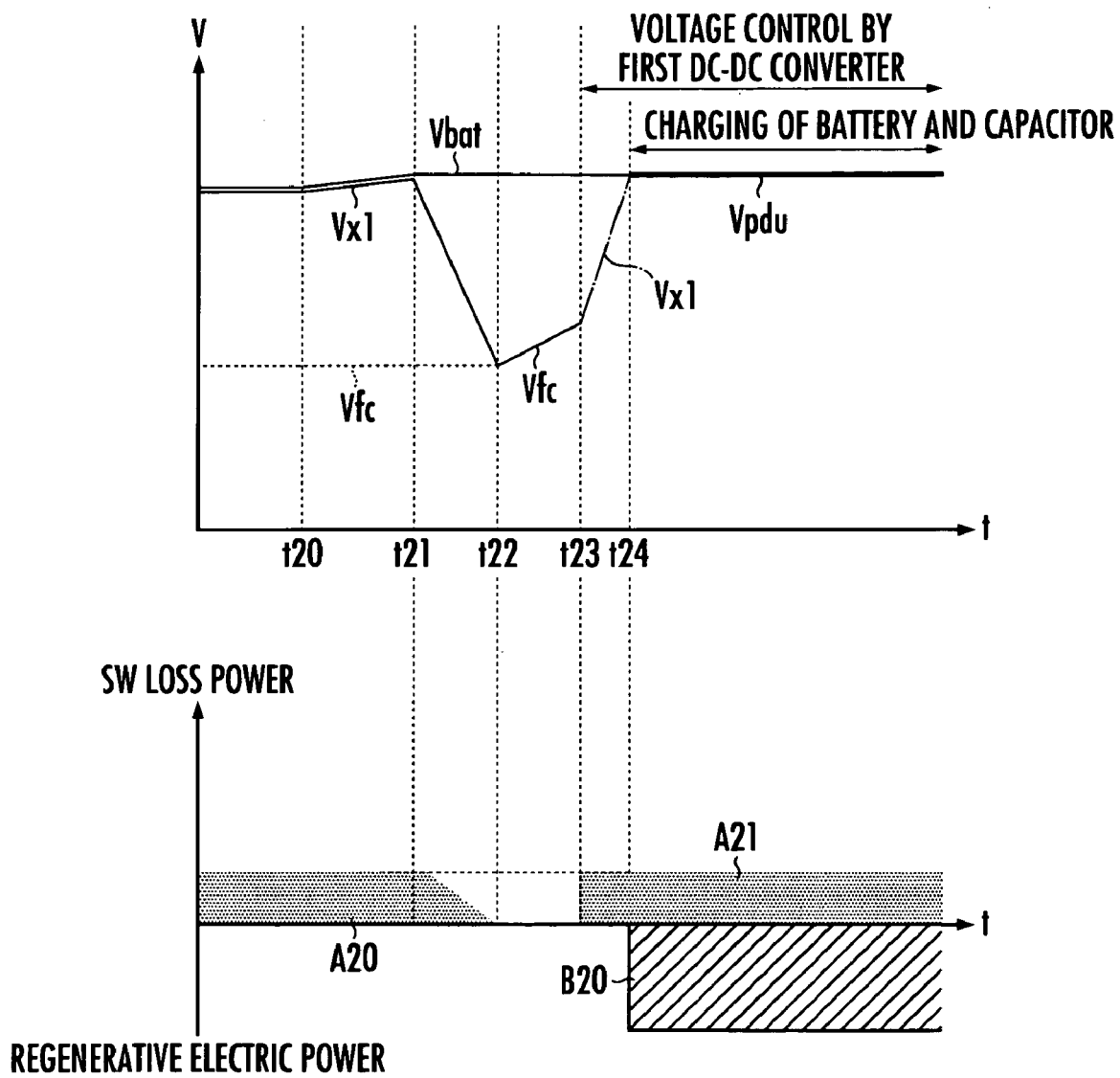
FIG. 9 is an explanatory diagram illustrating an operating mode of the DC-DC converter during execution of the regenerative control.
Figure 10:
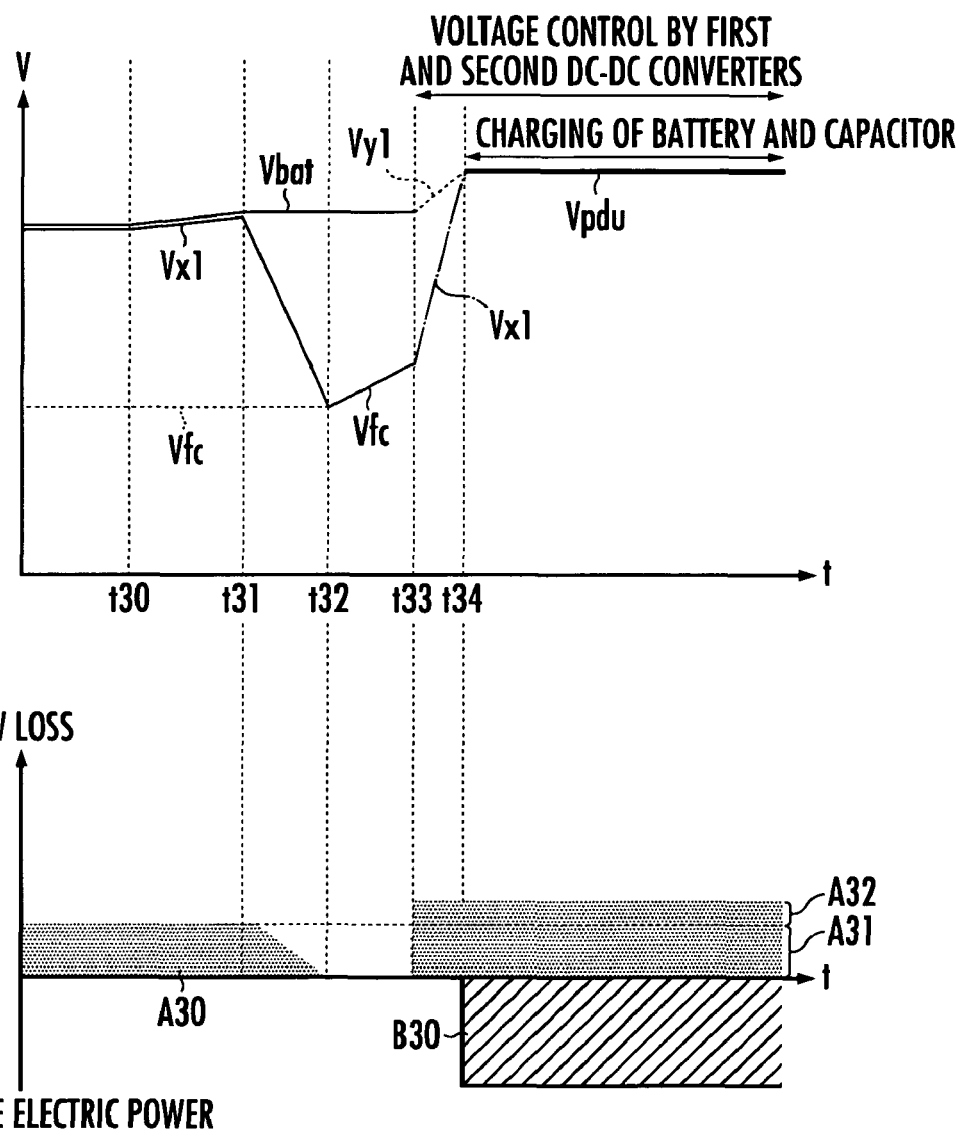
FIG. 10 is an explanatory diagram illustrating an operating mode of the DC-DC converter during execution of the regenerative control.
Figure 11:
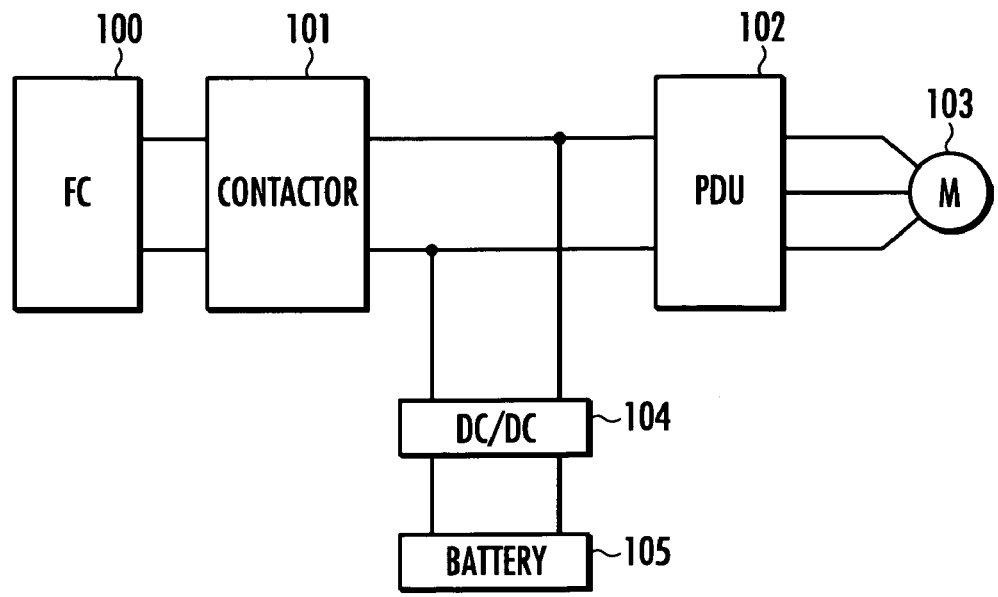
FIG. 11 is a configuration diagram of a conventional vehicle power supply device.
Figure 11:
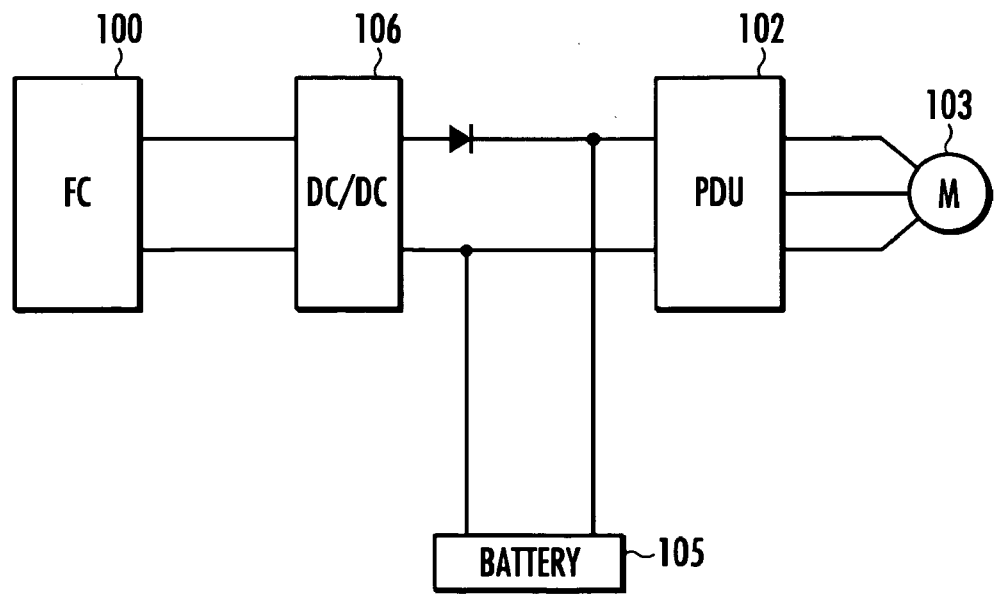
Figure 12:
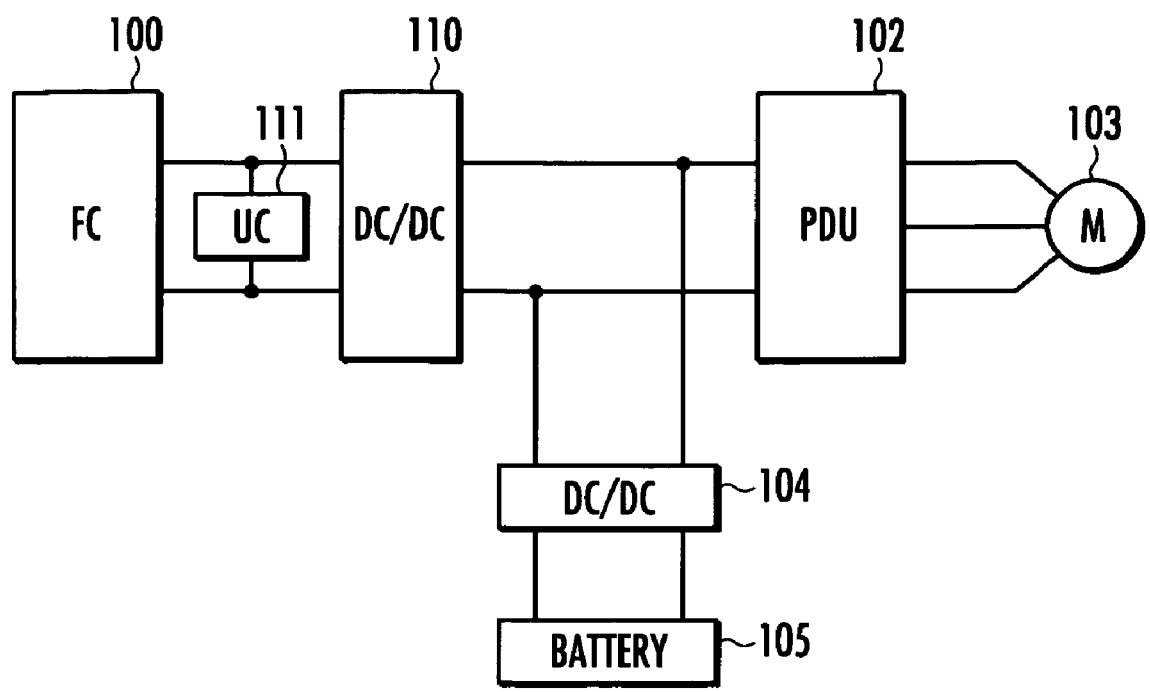
FIG. 12 is a configuration diagram of a supposed vehicle power supply device.

The preferred embodiments of the present invention will now be described in detail hereinafter with reference to FIG. 1 to FIG. 10. FIG. 1 is a general configuration diagram of a vehicle power supply device in this embodiment. FIG. 2 is a flowchart showing an execution procedure for output control in the vehicle power supply device shown in FIG. 1. FIG. 3 is an explanatory diagram showing an operating mode of the DC-DC converter during the output control in the flowchart shown in FIG. 2. FIG. 4 is a flowchart showing the execution procedure for output control in the vehicle power supply device shown in FIG. 1. FIG. 5 is an explanatory diagram showing an operating mode of the DC-DC converter during the output control in the flowchart shown in FIG. 4. FIGS. 6 to 7 are flowcharts showing the execution procedure for regenerative control in the vehicle power supply device shown in FIG. 1. FIGS. 8 to 10 are explanatory diagrams showing operating modes of the DC-DC converter during the regenerative control.

Referring to FIG. 1, the vehicle power supply device according to this embodiment is mounted on a fuel cell vehicle (corresponding to a vehicle of the present invention). Moreover, the vehicle power supply device includes a fuel cell 1, an electric double layer capacitor 2 (hereinafter, simply referred to as the capacitor 2) connected in parallel with the fuel cell 1, a power drive unit (PDU, which includes the function of an inverter of the present invention) in which first input-output sections 4a, 4b, and 4c are connected to the motor 5 via external input-output sections 11a, 11b, and 11c, a first DC-DC converter 3 in which first input-output sections 3a and 3b are connected to second input-output sections 4d and 4e of the PDU 4 and second input-output sections 3c and 3d are connected to the fuel cell 1 and the capacitor 2, respectively, a second DC-DC converter 20 in which first input-output sections 20a and 20b are connected to second input-output sections 4d and 4e of the PDU 4 and in which second input-output sections 20c and 20d are connected to a lithium-ion battery 21 (corresponding to a secondary battery of the present invention: hereinafter, simply referred to as the battery 21), and a fuel cell (FC) auxiliary device 22 which controls the amount of power generation of the fuel cell 1 by controlling the supply amount of reaction gas (hydrogen and oxygen) to the fuel cell 1.

Moreover, the vehicle power supply device is an electronic unit composed of a microcomputer (not shown) and the like, having a controller 30 which controls the general operation of the vehicle power supply device. Then, the microcomputer performs a control program for the vehicle power supply device, by which the controller 30 functions as a voltage control means 31 which performs an output control of managing the power supply performed by the fuel cell 1, the capacitor 2, and the battery 21 during power running of the motor 5 and a regenerative control of managing the power recovery performed by the capacitor 2 and the battery 21 during regeneration of the motor 5.

Moreover, the controller 30 has a memory 33 which stores various data which is used when the voltage control means 31 charges the capacitor 2 and the battery 21 with the management of the power recovery.

Note that the controller 30 receives inputs of signals detected by various sensors provided in the fuel cell 1 (detection signals of a temperature, voltage between terminals, output current, reaction gas supply pressure, and the like of the fuel cell 1) Fc_s, signals detected by various sensors provided in the capacitor 2 (detection signals of a temperature, voltage between terminals, input-output current and the like of the capacitor 2) Uc_s, signals detected by various sensors provided in the battery 21 (detection signals of a temperature, voltage between terminals, input-output current and the like of the battery 21) Li_s, and signals detected by various sensors provided in the PDU 4 (detection signals of supply current and voltage to the motor 5, regenerative current and voltage from the motor 5, and the like) Pd_s.

Moreover, a control signal Fc_c output from the controller 30 controls the amount of reaction gas supplied from the FC auxiliary device 22, which thereby controls the amount of power generation of the fuel cell 1. Further, a control signal Ps_c controls the current direction and output voltage of the first DC-DC converter 3 and a control signal Bi_c controls the current direction and output voltage of the second DC-DC converter 20. Still further, a control signal Pd_c adjusts the amount of power applied between the PDU4 and the motor 5 to control motoring torque and regenerative torque of the motor 5.

The voltage control means 31 detects the states of the fuel cell 1, the capacitor 2, and the battery 21 from the detection signals Fc_s, Uc_s, and Li_s of the various sensors and determines the total outputtable maximum power Wmax. Moreover, the voltage control means 31 determines a voltage output from the vehicle power supply device and target power Wc within a range that does not exceed the maximum power Wmax on the basis of a target torque Tr_c of the motor 5 determined according to the driving condition of a vehicle (vehicle speed, acceleration and deceleration, and the like) and the operating condition of a driver (the control input of accelerator pedal and the like), power consumption of the FC auxiliary device 22, and power consumption of other electric auxiliary devices (an air conditioner, audio equipment, and the like) which are not shown.

Furthermore, if the target torque Tr_c of the motor 5 is positive (Tr_c>0), the voltage control means 31 determines the ratio of distributing the output power of the fuel cell 1, the capacitor 2, and the battery 21 so that the target power Wc is obtained and the total efficiency of the fuel cell 1, the capacitor 2, and the battery 21 is optimum (the total internal resistance loss is minimized by weighing the internal resistance loss determined from the generating efficiency of the fuel cell 1 and the humidity condition of the fuel cell 1 and the internal resistance loss obtained with consideration of the temperature conditions of the capacitor 2 and the lithium-ion battery 21) and performs the output control for performing the power running of the motor 5.

On the other hand, if the target torque Tr_c of the motor 5 is negative, the voltage control means 31 performs regenerative control by performing the regeneration of the motor 5 to collect the regenerative electric power output from the motor 5 into the capacitor 2 and charging the capacitor 2 and the battery 21.

[Output Control]

First, the output control will be described below with reference to the flowcharts shown in FIG. 2 and FIG. 4.

The flowchart shown in FIG. 2 is provided to prevent power loss caused by switching in the second DC-DC converter 20 on the battery 21 side by controlling the second DC-DC converter 20 to be placed in a direct connection state. The voltage control means 31 proceeds to step 51 if the target torque Tr_c of the motor 5 is zero or greater ($0 \leq Tr\_c$) in step 50 of FIG. 2 and proceeds to step 60 if a required load (total power required for the operations of current consumers such as the motor 5 and the FC auxiliary device 22) is a reference value $P_L$ or lower.

The reference value $P_L$ is set to the upper limit of a range of enabling the improvement of the total fuel efficiency by causing the fuel cell vehicle to run only by an output from the battery 21. Then, the voltage control means 31 performs a battery running routine for running only with the output from the battery 21 with the power generation of the fuel cell 1 halted or with idling power generation (a state where the amount of power generation is extremely low) thereof in step 60.

Moreover, if the required load is greater than the reference value $P_L$ in step 51, the control proceeds to step 52, where the voltage control means 31 determines whether the required load is greater than the reference value $P_L$ and smaller than a reference value $P_M$ ($P_L$<required load<$P_M$).

The reference value $P_M$ is set to the lower limit of a range of enabling the improvement of the total fuel efficiency by assisting the fuel cell 1 in output thereof by increasing and supplying the output voltage $V_{fc}$ of the fuel cell 1 to the PDU 4 and supplying the output voltage $V_{bat}$ of the battery 21 to the PDU 4 without changing the voltage $V_{bat}$. If the required load is greater than the reference value $P_L$ and smaller than the reference value $P_M$ ($P_L$<required load<$P_M$) in step 52, the control branches to step 70.

In this instance, the required load is small and the output power of the fuel cell 1 and the capacitor 2 is available for the required load. Therefore, the voltage control means 31 performs the fuel cell running routine in which only the output of the fuel cell 1 and the capacitor 2 is used for running without the assist of the battery 21.

On the other hand, if the required load is equal to or greater than the reference value $P_M$ in step 52, the control proceeds to step 53, where the voltage control means 31 determines whether the required load is within the range of the reference value $P_M$ to a reference value $P_H$ ($P_M \leq$ required load $\leq P_H$). Note that the reference value $P_H$ is set to an upper limit of a range of enabling the improvement of the total fuel efficiency by assisting the fuel cell 1 in output thereof by increasing and supplying the output voltage $V_{fc}$ of the fuel cell 1 to the PDU 4 and supplying the output voltage $V_{bat}$ of the battery 21 to the PDU 4 without changing the voltage $V_{bat}$.

Therefore, if the required load is within the range of the reference value $P_M$ to the reference value $P_H$ in step 53, the control branches to step 80, in which the voltage control means 31 increases the output voltage $V_{fc}$ of the fuel cell 1 to the output voltage $V_{bat}$ of the battery 21 by using the first DC-DC converter 3. Then, in the next step 81, the voltage control means 31 places the second DC-DC converter 20 in the direct connection state (the state where the second DC-DC converter 20 is conductive between the first input-output sections 20a, 20b and the second input-output sections 20c, 20d bidirectionally). This causes the battery 21 to supply power to the PDU 4 to assist the fuel cell 1 and the capacitor 2 in supplying the insufficient output power therefrom.

On the other hand, if the required load is greater than the reference value $P_H$ in step 53, the control proceeds to step 54, where the voltage control means 31 increases the output voltage $V_{fc}$ of the fuel cell 1 (=the output voltage $V_{cap}$ of the capacitor 2) by using the first DC-DC converter 3. Further, in the next step 55, the voltage control means 31 increases the output voltage $V_{bat}$ of the battery 21 by using the second DC-DC converter 20.

This enables an increase in the output of the motor 5 by increasing the driving voltage to be applied to the motor 5 from the PDU 4 by increasing the voltage $V_{x1}$ supplied from the fuel cell 1 and the capacitor 2 to the PDU 4 via the first DC-DC converter 3 and the voltage $V_{y1}$ supplied from the battery 21 to the PDU 4 via the second DC-DC converter 20.

FIG. 3 shows an example of the change of the output voltage $V_{x1}$ of the first DC-DC converter 3 and the change of the output voltage $V_{y1}$ of the second DC-DC converter 20 when the output control is performed according to the flowchart of FIG. 2 described above. The upper section of FIG. 3 shows a graph with the ordinate axis set to voltage (V) and the abscissa axis set to time (t). The lower section of FIG. 3 shows a graph with the ordinate axis set to power loss caused by switching in the first DC-DC converter 3 and the second DC-DC converter 20 and the abscissa axis set to time (t).

Reference $t_{50}$ in FIG. 3 indicates the time point of starting the increase in the output voltage $V_{fc}$ of the fuel cell 1 performed by the first DC-DC converter 3. The output voltage $V_{x1}$ of the first DC-DC converter 3 increases to the output voltage $V_{bat}$ of the battery 21 at time $t_{51}$. The second DC-DC converter 20 is placed in the direct connection state between time $t_{50}$ to time $t_{52}$, and therefore the power loss by switching does not occur in the second DC-DC converter 20, but only power loss $A_{50}$ occurs in the first DC-DC converter 3.

Reference $t_{52}$ indicates the time point at which the required load exceeds the reference value $P_H$ and the output voltage $V_{fc}$ of the fuel cell 1 is increased by the first DC-DC converter 3 and the output voltage $V_{bat}$ of the battery 21 is increased by the second DC-DC converter 20. Then, the output voltage $V_{x1}$ of the first DC-DC converter 3 and the output voltage $V_{y1}$ of the second DC-DC converter 20 reach the voltage $V_{pdu}$ according to the required load at time $t_{53}$.

Both of the first DC-DC converter 3 and the second DC-DC converter 20 perform a voltage step-up operation by switching from time $t_{52}$ to time $t_{54}$, which thereby causes a power loss $A_{50}$ in the first DC-DC converter 3 and a power loss $A_{51}$ in the second DC-DC converter 20.

Subsequently, the flowchart shown in FIG. 4 is provided to control the first DC-DC converter 3 on the fuel cell 1 side to be placed in the direct connection state. The voltage control means 31 proceeds to step 101 if the target torque Tr_c of the motor 5 becomes zero or greater ($0 \leq$ Tr_c) in step 100 of FIG. 4 and proceeds to step 110 if the required load is equal to or lower than the reference value $P_L$.

Note that the reference value $P_L$ is set to the upper limit of the range of enabling the improvement of the total fuel efficiency by causing the fuel cell vehicle to run only by the output from the battery 21, similarly to the case of FIG. 2 described above. Then, the voltage control means 31 performs the battery running routine for running only by the output from the battery 21 with the power generation of the fuel cell 1 halted or with idling power generation thereof in step 110.

Moreover, if the required load is greater than the reference value $P_L$ in step 101, the voltage control means 31 proceeds to step 102 to determine whether the required load is greater than the reference value $P_L$ and smaller than the reference value $P_M$ ($P_L$<required load<$P_M$).

Note that the reference value $P_M$ is set to a lower limit within a range of enabling the improvement of the total fuel efficiency by assisting the PDU 4 in output power thereof by decreasing the output voltage $V_{bat}$ of the battery 21 supplied to the PDU 4 without increasing the voltage $V_{fc}$ of the fuel cell 1. If the required load is greater than the reference value $P_L$ and smaller than the reference value $P_M$ ($P_L$<required load<$P_M$) in step 102, the control branches to step 120.

In this instance, the required load is small and the output power of the fuel cell 1 and the capacitor 2 is available for the required load. Therefore, the voltage control means 31 performs the fuel cell running routine in which only the output of the fuel cell 1 and the capacitor 2 is used for running without the assist of the battery 21.

On the other hand, if the required load exceeds the reference value $P_M$ in step 103, the control proceeds to step 104, where the voltage control means 31 determines whether the required load is within the range of the reference value $P_M$ to the reference value $P_H$ ($P_M \leq$ required load $\leq P_H$). Note that the reference value $P_H$ is set to the upper limit of a range of enabling the improvement of the total fuel efficiency by assisting the output power to the PDU 4 by decreasing the output voltage $V_{bat}$ of the battery 21 without increasing the output voltage $V_{fc}$ of the fuel cell 1.

Therefore, if the required load is within the range of the reference value $P_M$ to the reference value $P_H$ in step 103, the control branches to step 130, in which the voltage control means 31 decreases the output voltage $V_{bat}$ of the battery 21 to the output voltage $V_{fc}$ of the fuel cell 1 by using the second DC-DC converter 20. Then, in the next step 131, the voltage control means 31 places the first DC-DC converter 3 in the direct connection state (the state where the first DC-DC converter 3 is conductive between the first input-output sections 3a, 3b and the second input-output sections 3c, 3d bidirectionally). This causes the battery 21 to supply power to the PDU 4 to assist the fuel cell 1 and the capacitor 2 in supplying the insufficient output power therefrom.

On the other hand, if the required load is greater than the reference value $P_H$ in step 103, the control proceeds to step 104, where the voltage control means 31 increases the output voltage $V_{fc}$ of the fuel cell 1 to the output voltage $V_{bat}$ of the battery 21 by using the first DC-DC converter 3. Further, in the next step 105, the voltage control means 31 places the second DC-DC converter 20 in the direct connection state.

This enables an increase in the output of the motor 5 by increasing the driving voltage applied to the motor 5 from the PDU 4 by increasing the voltage $V_{x1}$ supplied from the fuel cell 1 and the capacitor 2 to the PDU 4 via the first DC-DC converter 3 and the voltage $V_{y1}$ supplied from the battery 21 to the PDU 4 via the second DC-DC converter 20.

FIG. 5 shows an example of the change in the output voltage $V_{x1}$ of the first DC-DC converter 3 and the change in the output voltage $V_{y1}$ of the second DC-DC converter 20 when the output control is performed according to the flowchart of FIG. 3 described above. The upper section of FIG. 5 shows a graph with the ordinate axis set to voltage (V) and the abscissa axis set to time (t). The lower section of FIG. 5 shows a graph with the ordinate axis set to switching loss in the first DC-DC converter 3 and the second DC-DC converter 20 and the abscissa axis set to time (t).

Reference $t_{60}$ in FIG. 5 indicates the time point of starting the decrease of the output voltage $V_{bat}$ of the battery 21 performed by the second DC-DC converter 20. The output voltage $V_{y1}$ of the second DC-DC converter 20 decreases to the output voltage $V_{fc}$ of the fuel cell 1 at time $t_{61}$. The first DC-DC converter 3 is placed in the direct connection state between time $t_{60}$ to time $t_{62}$, and therefore the power loss by switching does not occur in the first DC-DC converter 3, but only power loss $A_{60}$ occurs in the second DC-DC converter 20.

Reference $t_{62}$ indicates the time point at which the required load exceeds the reference value $P_H$ and the output voltage $V_{fc}$ of the fuel cell 1 is increased from time $t_{62}$ by the first DC-DC converter 3 and the output voltage $V_{x1}$ of the first DC-DC converter 3 reaches the output voltage $V_{bat}$ of the battery 21 at time $t_{65}$. Further, the output voltage $V_{y1}$ of the second DC-DC converter 20 is adjusted to the output voltage $V_{x1}$ of the first DC-DC converter 3. In the time $t_{62}$ to time $t_{65}$, both of the power loss $A_{61}$ of the first DC-DC converter 3 and the power loss $A_{60}$ of the second DC-DC converter 20 occur.

Further, the second DC-DC converter 20 is placed in the direct connection state at time $t_{65}$ at which the output voltage $V_{x1}$ of the first DC-DC converter 3 reaches the output voltage $V_{bat}$ of the battery 21. Thereby, only the power loss $A_{61}$ of the first DC-DC converter 3 occurs at time $t_{65}$ and after, but no power loss occurs in the second DC-DC converter 20.

[Regenerative Control]

Subsequently, the regenerative control will be described below with reference to the flowcharts shown in FIG. 6 to FIG. 7.

The voltage control means 31 proceeds to step 2 if the target torque Tr_c of the motor 5 is negative (Tr_c<0) in step 1 of FIG. 6 to determine whether the regenerative current of the motor 5 (detected by the detection signal Pd_s from the PDU 4) is smaller than a distribution reference value (data on the distribution reference value is previously stored in the memory 33). If the regenerative current of the motor 5 is smaller than the distribution reference value, the control proceeds to step 2, where the control branches to step 20 of FIG. 7 if the regenerative current of the motor 5 is equal to or greater than the distribution reference value.

In step 3, the voltage control means 31 determines whether the regenerative current of the motor 5 is greater than a battery reference value (data on the battery reference value is previously stored in the memory 33). If the regenerative current of the motor 5 is greater than the battery reference value, the control proceeds to step 4, where the control branches to step 7 if the regenerative current of the motor 5 is equal to or less than the battery reference value.

In step 4, the voltage control means 31 controls the PDU 4 so that the voltage $V_{pdu}$ between the second input-output sections 4d and 4e of the PDU 4 is higher than the voltage $V_{fc}$ between the terminals of the fuel cell 1 (=the voltage $V_{cap}$ between the terminals of the capacitor 2) and lower than the upper limit voltage $V_{cap\_lmt}$ of the capacitor 2. Specifically, the output $V_{pdu}$ between the second input-output sections 4d and 4e of the PDU 4 is controlled to a range of higher than the voltage $V_{cap}$ and lower than the voltage $V_{cap\_lmt}$ ($V_{cap}<V_{pdu}<V_{cap\_lmt}$) by switching of a transistor constituting the inverter provided in the PDU 4.

Thereafter, in the next step 5, the voltage control means 31 places the first DC-DC converter 3 in the direct connection state. This halts the switching operation of the first DC-DC converter 3, thereby causing the first DC-DC converter 3 to be always conductive between the first input-output sections 3a, 3b and the second input-output sections 3c, 3d.

FIG. 8 shows an example of the change of the voltage $V_{cap}$ between the terminals of the capacitor 2 (=the voltage $V_{fc}$ between the terminals of the fuel cell 1), the change of the voltage $V_{bat}$ between the terminals of the battery 21, and the change of the voltage $V_{x1}$ between the first input-output sections 3a and 3b of the first DC-DC converter 3, in the case where the first DC-DC converter 3 is placed in the direct connection state.

The upper section of FIG. 8 shows a graph with the ordinate axis set to voltage (V) and the abscissa axis set to time (t). The lower section of FIG. 8 shows a graph with the upper part of the ordinate axis set to switching loss in the first DC-DC converter 3 and the lower part of the ordinate axis set to regenerative electric power applied to the capacitor 2 and with the abscissa axis set to time (t).

Reference $t_{10}$ in FIG. 8 indicates the time point of starting the decrease in assist output from the battery 21, in the state where the motor 5 is operated in the power running mode, by increasing the output voltage $V_{fc}$ of the fuel cell 1 by using the first DC-DC converter 3 and supplying the output voltage to the PDU 4 and supplying voltage from the battery 21 to the PDU 4 via the second DC-DC converter 20 placed in the direct connection state.

The voltage control means 31 sets off the second DC-DC converter 20 (a state where the second DC-DC converter 20 is disconnected between the first input-output sections 20a, 20b and the second input-output sections 20c, 20d) at time $t_{11}$ and gradually decreases the voltage $V_{x1}$ between the first input-output sections 3a and 3b of the first DC-DC converter 3 from time $t_{11}$ to time $t_{12}$, so that the first DC-DC converter 3 is placed in the direct connection state ($V_{x2}=V_{x1}$) at time $t_{12}$.

Thereby, the switching loss $A_{10}$ in the first DC-DC converter 3 gradually decreases from time $t_{11}$ to time $t_{12}$ and the switching loss $A_{10}$ in the first DC-DC converter 3 becomes zero at time $t_{12}$.

Thereafter, with the decrease of the output current of the fuel cell 1, the voltage $V_{x1}$ between the first input-output sections 3a and 3b of the first DC-DC converter 3 gradually increases from time $t_{12}$ to time $t_{13}$. The voltage control means 31 starts the output of the regenerative electric power of the motor 5 using the PDU 4 at time $t_{13}$ and controls the voltage $V_{pdu}$ between the second input-output sections 4d and 4e of the PDU 4 to a range of higher than the voltage $V_{cap}$ between the terminals of the capacitor 2 and lower than the upper limit voltage $V_{cap\_lmt}$ of the capacitor 2 ($V_{cap}<V_{pdu}<V_{cap\_lmt}$).

This charges the capacitor 2 with the regenerative electric power $B_{10}$ of the motor 5, thereby gradually increasing the voltage $V_{cap}$ between the terminals of the capacitor 2. The voltage $V_{pdu}$ between the second input-output sections 4d and 4e of the PDU 4 in this case corresponds to a voltage higher than the voltage between the terminals of the capacitor 2 by a predetermined level in the present invention.

Subsequently, the voltage control means 31 determines whether to continue to charge the capacitor 2 from the state of charge of the capacitor 2 (determines the state on the basis of the voltage $V_{cap}$ between the terminals of the capacitor 2, the charging current to the capacitor 2, and the like) in step 6. The voltage control means 31 proceeds to step 7 to terminate the charge to the capacitor 2 or branches to step 1 to continue to charge the capacitor 2.

In step 7, the voltage control means 31 sets off the first DC-DC converter 3 (a state where the first DC-DC converter 3 is disconnected between the first input-output sections 3a, 3b and the second input-output sections 3c, 3d), so that the second DC-DC converter 20 is placed in the direct connection state. This halts the switching operation of the second DC-DC converter 20, thereby causing the second DC-DC converter 20 to be always conductive between the first input-output sections 20a, 20b and the second input-output sections 20c, 20d.

Then, in the next step 8, a charge control means 32 controls the PDU 4 to charge the battery 21 so that the voltage $V_{pdu}$ between the second input-output sections 4d and 4e of the PDU 4 is higher than the voltage $V_{bat}$ between the terminals of the battery 21 by a predetermined level. In this way, it is possible to charge the battery 21 while preventing an occurrence of the switching loss in the second DC-DC converter 20 by placing the second DC-DC converter 20 in the direct connection state.

In the next step 9, the voltage control means 31 determines whether to terminate the regeneration of the motor 5 from the state of charge of the battery 21 (the state is determined on the basis of the voltage $V_{bat}$ between the terminals of the battery 21, the charging current of the battery 21, and the like). The voltage control means 31 proceeds to step 10 to terminate the regeneration or branches to step 1 to continue the regeneration.

Then, step 20 and subsequent steps of FIG. 7 correspond to processing of charging the capacitor 2 and the battery 21 simultaneously by using the regenerative electric power of the motor 5. The voltage control means 31 determines, in step 20, whether the voltage $V_{pdu}$ between the second input-output sections 4d and 4e of the PDU 4 is capable of charging the capacitor 2 with the first DC-DC converter 3 placed in the direct connection state or charging the battery 21 with the second DC-DC converter 20 placed in the direct connection state.

If the voltage is capable of charging the capacitor 2 with the first DC-DC converter 3 in the direct connection state or charging the battery 21 with the second DC-DC converter 20 in the direct connection state, the voltage control means 31 proceeds to step 21. If neither of the first DC-DC converter 3 and the second DC-DC converter 20 can be placed in the direct connection state, the voltage control means 31 branches to step 20.

To place the first DC-DC converter 3 in the direct connection state in step 21, the voltage control means 31 controls the voltage $V_{pdu}$ between the second input-output sections 4d and 4e of the PDU 4 to place the first DC-DC converter 3 in the direct connection state, similarly to steps 4 and 5 of FIG. 6 described above. Then, the voltage control means 31 controls the operation of the second DC-DC converter 20 so that the voltage between the second input-output sections 20d and 20e of the second DC-DC converter 20 is higher than the voltage $V_{bat}$ between the terminals of the battery 21 by a predetermined level.

In step 22, the capacitor 2 is thereby charged with the power supplied from the PDU 4 via the first DC-DC converter 3 in the direct connection state and the battery 21 is charged with the power supplied from the PDU 4 via the second DC-DC converter 20 in a voltage conversion state.

Moreover, to place the second DC-DC converter 20 in the direct connection state, the voltage control means 31 controls the voltage $V_{pdu}$ between the second input-output sections 4d and 4e of the PDU 4 in step 21 in the same manner as in step 7 and step 8 of FIG. 6 described above. Then, the voltage control means 31 controls the voltage $V_{x2}$ between the second input-output sections 3c and 3d of the first DC-DC converter 3 to a range of higher than the voltage $V_{cap}$ between the terminals of the capacitor 2 and lower than the upper limit voltage $V_{cap\_lmt}$ of the capacitor 2 ($V_{cap}<V_{x2}<V_{cap\_lmt}$).

In step 22, the battery 21 is thereby charged with power supplied from the PDU 4 via the second DC-DC converter 20 in the direct connection state and the capacitor 2 is charged with power supplied from the PDU 4 via the first DC-DC converter 3 in the voltage conversion state.

FIG. 9 shows an example of the changes of the voltage $V_{cap}$ between the terminals of the capacitor 2 (=the voltage $V_{fc}$ between the terminals of the fuel cell 1), the voltage $V_{bat}$ between the terminals of the battery 21, the voltage $V_{x1}$ between the first input-output sections 3a and 3b of the first DC-DC converter 3, the voltage $V_{x2}$ between the second input-output sections 3c and 3d of the first DC-DC converter 3, and the voltage $V_{pdu}$ between the second input-output sections 4d and 4e of the PDU 4, in the case where the battery 21 and the capacitor 2 are charged with the second DC-DC converter 20 placed in the direct connection state.

The upper section of FIG. 9 shows a graph with the ordinate axis set to voltage (V) and the abscissa axis set to time (t). The lower section of FIG. 9 shows a graph with the upper part of the ordinate axis set to switching loss in the first DC-DC converter 3 and the lower part of the ordinate axis set to regenerative electric power applied to the battery 21 and with the abscissa axis set to time (t).

Reference $t_{20}$ in FIG. 9 indicates the time point of starting the decrease of assist output from the battery 21, in the state where the motor 5 is operated in the power running mode, by increasing the output voltage $V_{fc}$ (=voltage $V_{cap}$ between the terminals of the capacitor 2) of the fuel cell 1 by using the first DC-DC converter 3 and supplying the output voltage to the PDU 4 and supplying voltage from the battery 21 to the PDU 4 via the second DC-DC converter 20 placed in the direct connection state.

The voltage control means 31 sets off the second DC-DC converter 20 (a state where the second DC-DC converter 20 is disconnected between the first input-output sections 20a, 20b and the second input-output sections 20c, 20d) at time $t_{21}$ and gradually decreases the voltage $V_{x1}$ between the first input-output sections 3a and 3b of the first DC-DC converter 3 from time $t_{21}$ to time $t_{22}$, so that the first DC-DC converter 3 is placed in the direct connection state at time $t_{22}$.

Thereby, the switching loss $A_{20}$ in the first DC-DC converter 3 gradually decreases from time $t_{21}$ to time $t_{22}$ and the switching loss $A_{20}$ in the first DC-DC converter 3 becomes zero at time $t_{22}$.

Thereafter, with the decrease of the output current of the fuel cell 1, the voltage between the first input-output sections 3a and 3b of the first DC-DC converter 3 gradually increases from time $t_{22}$ to time $t_{23}$. The voltage control means 31 controls the voltage $V_{x2}$ between the second input-output sections 3c and 3d of the first DC-DC converter 3 to a range of higher than the voltage $V_{cap}$ between the terminals of the capacitor 2 and lower than the upper limit voltage $V_{cap\_lmt}$ of the capacitor 2 ($V_{cap}<V_{pdu}<V_{cap\_lmt}$) at time $t_{23}$ and after.

The voltage control means 31 starts the output of regenerative electric power using the PDU 4 at time $t_{24}$ and controls the PDU 4 so that the voltage between the second input-output sections 4d and 4e of the PDU 4 is higher than the voltage $V_{bat}$ between the terminals of the battery 21 by a predetermined level. This charges the battery 21 with the regenerative electric power $B_{20}$ of the motor 5, which is supplied via the second DC-DC converter 20.

Moreover, the capacitor 2 is charged with the regenerative electric power $B_{20}$ of the motor 5, which is supplied via the first DC-DC converter 3. In this instance, a switching loss $A_{21}$ occurs in the first DC-DC converter 3, while no switching loss occurs in the second DC-DC converter 20 since the second DC-DC converter 20 is in the direct connection state.

Subsequently, step 30 to step 32 correspond to processing performed in a situation where it is impossible to place both of the first DC-DC converter 3 and the second DC-DC converter 20 in the direct connection state. In step 30, the voltage control means 31 controls the voltage between the second input-output sections 4d and 4e of the PDU 4 to a voltage capable of charging the capacitor 2 and the battery 21 at a time.

Thereafter, in the next step 31, the voltage control means 31 controls the operation of the first DC-DC converter 3 so that the voltage $V_{x2}$ between the second input-output sections 3c and 3d of the first DC-DC converter 3 is in the range of higher than the voltage $V_{cap}$ between the terminals of the capacitor 2 and lower than the upper limit voltage $V_{cap\_lmt}$ between the terminals of the capacitor 2 ($V_{cap} < V_{x2} < V_{cap\_lmt}$).

Moreover, the voltage control means 31 controls the operation of the second DC-DC converter 20 so that the voltage $V_{y2}$ between the second input-output sections 20c and 20d of the second DC-DC converter 20 becomes higher than the voltage $V_{bat}$ between the terminals of the battery 21 by a predetermined level.

In step 32, the capacitor 2 is thereby charged with the regenerative electric power of the motor 5 supplied from the PDU 4 via the first DC-DC converter 3 in the voltage conversion state. Moreover, the battery 21 is charged with the regenerative electric power of the motor 5 supplied from the PDU 4 via the second DC-DC converter 20 in the voltage conversion state.

FIG. 10 shows the changes of the voltage $V_{cap}$ between the terminals of the capacitor 2 (=the voltage $V_{fc}$ between the terminals of the fuel cell 1), the voltage $V_{bat}$ between the terminals of the battery 21, the voltage $V_{x1}$ between the first input-output sections 3a and 3b of the first DC-DC converter 3, the voltage $V_{y1}$ between the first input-output sections 20c and 20d of the second DC-DC converter 20, and the voltage $V_{pdu}$ between the second input-output sections 4d and 4e of the PDU 4, in the case where the capacitor 2 and the battery 21 are charged by the above processing of step 30 to step 32 with both of the first DC-DC converter 3 and the second DC-DC converter 20 placed in the voltage conversion state by switching.

The upper section of FIG. 10 shows a graph with the ordinate axis set to voltage (V) and the abscissa axis set to time (t). The lower section of FIG. 10 shows a graph with the upper part of the ordinate axis set to switching loss in the first DC-DC converter 3 and in the second DC-DC converter 20 and the lower part of the ordinate axis set to regenerative electric power applied to the capacitor 2 and to the battery 21 and with the abscissa axis set to time (t).

Reference $t_{30}$ in FIG. 10 indicates the time point of starting the decrease of assist output from the battery 21, in the state where the motor 5 is operated in the power running mode, by increasing the output voltage $V_{fc}$ of the fuel cell 1 using the first DC-DC converter 3 and supplying the output voltage to the PDU 4 and by supplying voltage from the battery 21 to the PDU 4 via the second DC-DC converter 20 placed in the direct connection state.

The voltage control means 31 sets off the second DC-DC converter 20 (a state where the second DC-DC converter 20 is disconnected between the first input-output sections 20a, 20b and the second input-output sections 20c, 20d) at time $t_{31}$ and gradually decreases the voltage $V_{x1}$ between the first input-output sections 3a and 3b of the first DC-DC converter 3 from time $t_{31}$ to time $t_{32}$, so that the first DC-DC converter 3 is placed in the direct connection state at time $t_{32}$.

Thereby, the switching loss $A_{30}$ in the first DC-DC converter 3 gradually decreases from time $t_{31}$ to time $t_{32}$ and the switching loss $A_{30}$ in the first DC-DC converter 3 becomes zero at time $t_{32}$.

Thereafter, with the decrease of the output current of the fuel cell 1, the voltage $V_{x1}$ (=$V_{fc}$, $V_{cap}$) between the first input-output sections 3a and 3b of the first DC-DC converter 3 gradually increases from time $t_{32}$ to time $t_{33}$. The voltage control means 31 increases the voltage $V_{pdu}$ between the second input-output sections 4d and 4e of the PDU 4 at time $t_{33}$ to time $t_{34}$, thereby increasing the voltage $V_{x1}$ between the first input-output sections 3a and 3b of the first DC-DC converter 3 and the voltage $V_{y1}$ between the first input-output sections 20a and 20b of the second DC-DC converter 20 toward the voltage $V_{pdu}$.

Further, the voltage control means 31 controls the voltage $V_{x2}$ between the second input-output sections 3c and 3d of the first DC-DC converter 3 to a range of higher than the voltage $V_{cap}$ between the terminals of the capacitor 2 and lower than the upper limit voltage $V_{cap\_lmt}$ between the terminals of the capacitor 2 ($V_{cap} < V_{x2} < V_{cap\_lmt}$) at time $t_{34}$ and after. Moreover, the voltage control means 31 controls the voltage between the second input-output sections 20c and 20d of the second DC-DC converter 20 to a voltage higher than the voltage $V_{bat}$ between the terminals of the battery 21 by a predetermined level at time $t_{34}$ and after.

Thereby, the capacitor 2 is charged with regenerative electric power (a part of $B_{30}$) of the motor 5 supplied from the PDU 4 via the first DC-DC converter 3 in the voltage conversion state. Moreover, the battery 21 is charged with the regenerative electric power (a part of $B_{30}$) of the motor 5 supplied from the PDU 4 via the second DC-DC converter 20 in the voltage conversion state. In this instance, a switching loss $A_{31}$ occurs in the first DC-DC converter and a switching loss $A_{32}$ occurs in the second DC-DC converter 20.

Although the lithium-ion battery is used as the secondary battery of the present invention and the electric double layer capacitor is used as the capacitor of the present invention in this embodiment, the specifications of the secondary battery and the capacitor of the present invention are not limited thereto, but it is possible to use a secondary battery and a capacitor which meet other specifications.

Moreover, although this embodiment shows the configuration in which two control modes are applied: a control mode in which the second DC-DC converter 20 between the PDU 4 and the battery 21 performs voltage conversion with the first DC-DC converter 3 between the PDU 4 and the capacitor 2 in the direct connection state; and a control mode in which the first DC-DC converter 3 between the PDU 4 and the capacitor 2 performs voltage conversion with the second DC-DC converter 20 between the PDU 4 and the battery 21 in the direct connection state, it is possible to achieve the effect as the present invention by using only one of the control modes.

What is claimed is:

1. A vehicle power supply device which is mounted on a vehicle and connected to a motor rotating with a driving wheel via an external input-output section so as to supply the motor with driving electric power during power running of the motor and to recover regenerative electric power of the motor during regeneration of the motor, the vehicle power supply device comprising:

an inverter which has first and second input-output sections with the first input-output section connected to the external input-output section and which generates a driving voltage of the motor from a DC voltage, which is input to the second input-output section, and outputs the driving voltage from the first input-output section during the power running of the motor, while converting a regenerative voltage of the motor, which is input to the first input-output section, to a DC voltage and outputting the DC voltage from the second input-output section during the regeneration of the motor;

a fuel cell;

a capacitor connected in parallel with the fuel cell;

a first bidirectional DC-DC converter which has first and second input-output sections and wherein the first input-output section is connected to the second input-output section of the inverter and the second input-output section is connected to the fuel cell and the capacitor;

a secondary battery;

a second bidirectional DC-DC converter which has first and second input-output sections and wherein the first input-output section is connected to the second input-output section of the inverter and the second input-output section is connected to the secondary battery; and a sensor;

a voltage control means which places one of the first DC-DC converter and the second DC-DC converter in a direct connection state, detects an output voltage of the DC-DC converter placed in the direct connection state during at least one of the power running and the regeneration of the motor by the sensor and controls an output voltage of the other DC-DC converter according to analysis of the detection signal from the sensor; and a capacitor voltage detection means which detects a voltage between terminals of the capacitor, wherein the voltage control means controls the inverter so that an output voltage from the second input-output section of the inverter becomes higher than the voltage between the terminals of the capacitor by a predetermined level, which enables charging of the capacitor with the regenerative electric power of the motor, to place the first DC-DC converter in the direct connection state during the regeneration of the motor.

2. The vehicle power supply device according to claim 1, wherein:

an output voltage of the secondary battery is set to a voltage higher than an output voltage range of the fuel cell; and the voltage control means places the first DC-DC converter in the direct connection state and causes the second DC-DC converter to perform a step-down operation so as to decrease a difference between the output voltage of the first DC-DC converter and the output voltage of the second DC-DC converter during the power running of the motor.

3. The vehicle power supply device according to claim 1, further comprising a secondary battery voltage detection means which detects a voltage between terminals of the secondary battery, wherein the voltage control means controls the second DC-DC converter so that an output voltage from the second input-output section of the second DC-DC converter becomes higher than the voltage between the terminals of the secondary battery by a predetermined level when controlling the inverter so that the output voltage from the second input-output section of the inverter becomes higher than the voltage between the terminals of the capacitor by the predetermined level to place the first DC-DC converter in the direct connection state during the regeneration of the motor.

4. A vehicle power supply device which is mounted on a vehicle and connected to a motor rotating with a driving wheel via an external input-output section so as to supply the motor with driving electric power during power running of the motor and to recover regenerative electric power of the motor during regeneration of the motor, the vehicle power supply device comprising:

an inverter which has first and second input-output sections with the first input-output section connected to the external input-output section and which generates a driving voltage of the motor from a DC voltage, which is input to the second input-output section, and outputs the driving voltage from the first input-output section during the power running of the motor, while converting a regenerative voltage of the motor, which is input to the first input-output section, to a DC voltage and outputting the DC voltage from the second input-output section during the regeneration of the motor;

a fuel cell;

a capacitor connected in parallel with the fuel cell;

a first bidirectional DC-DC converter which has first and second input-output sections and wherein the first input-output section is connected to the second input-output section of the inverter and the second input-output section is connected to the fuel cell and the capacitor;

a secondary battery;

a second bidirectional DC-DC converter which has first and second input-output sections and wherein the first input-output section is connected to the second input-output section of the inverter and the second input-output section is connected to the secondary battery; and a sensor;

a voltage control means which places one of the first DC-DC converter and the second DC-DC converter in a direct connection state, detects an output voltage of the DC-DC converter placed in the direct connection state during at least one of the power running and the regeneration of the motor by the sensor and controls an output voltage of the other DC-DC converter according to analysis of the detection signal from the sensor; and a secondary battery voltage detection means which detects a voltage between terminals of the secondary battery, wherein the voltage control means controls the inverter so that an output voltage from the second input-output section of the inverter becomes higher than the voltage between the terminals of the secondary battery by a predetermined level, which enables charging of the secondary battery with the regenerative electric power of the motor, to place the second DC-DC converter in the direct connection state during the regeneration of the motor.

5. The vehicle power supply device according to claim 4, further comprising a capacitor voltage detection means which detects a voltage between terminals of the capacitor, wherein the voltage control means controls the first DC-DC converter so that an output voltage from the second input-output section of the first DC-DC converter becomes higher than the voltage between the terminals of the capacitor by a predetermined level when controlling the inverter so that the output voltage from the second input-output section of the inverter becomes higher than the voltage between the terminals of the capacitor by the predetermined level to place the second DC-DC converter in the direct connection state during the regeneration of the motor.

* * * * *